June 27, 1950 J. O. JACKSON 2,513,178
BOLTED FLANGE CONNECTION
Filed Feb. 22, 1945

INVENTOR
James O. Jackson
BY Green + McCallister
his ATTORNEYS

Patented June 27, 1950

2,513,178

UNITED STATES PATENT OFFICE 2,513,178

BOLTED FLANGE CONNECTION

James O. Jackson, Crafton, Pa., assignor to Pittsburgh-Des Moines Company, a corporation of Pennsylvania Application February 22, 1945, Serial No. 579,193

11 Claims. (Cl. 285—130)

1

This invention relates to bolted flange joints such as used in connecting sections of pipe or other hollow circular members or devices.

The bolted flange joints now generally used are of two types. Those in which the adjacent faces of the flanges or flange members are flat and those in which such faces are stepped so that the portions of the flanges through which the bolts extend are normally spaced apart.

In both types, a yielding gasket or packing is placed between the adjacent or co-operating faces inside of the circle defined by the bolts by which the flanges are secured together.

Apparently the problem of the stress in bolted flange joints such as these has not, until recently, been given the analytical study that such problem deserves.

The references usually cited are as follows:

"Rules for Bolted Flange Connections," A. S. M. E. Boiler Construction Code, 1943 edition;

"Strength of Material," Part II, by S. Timoshenko, D. Van Nostrand Company, New York, p. 180;

E. O. Waters, "Journal Applied Mechanics," vol. 59, 1937, p. 161;

J. D. Mattimore, N. O. Smith-Petersen and H. C. Bell, "Transaction American Society of Mechanical Engineers," vol. 60, 1938, p. 297.

Fundamentally the above references consider the flange of a pipe to be a ring rigidly attached to the pipe wall and having equally spaced concentrated loads applied somewhere near its outer peripheral edge. Since the loads are applied away from the pipe wall, there is a tendency for the flange to curl or twist about the pipe when in use. In order to prevent leakage and keep the flanges of a flange joint together, it is necessary that a sufficient number of bolts be used. The problem involved is to transfer the bolt loads from the bolt circle to the pipe wall where it will be resisted by equal force. Under the action of these forces, the cross sections of the flanges rotate and the walls of the pipe bend.

Ordinarily the flange is very rigid in comparison to the pipe and does not enlarge in radius as much as the pipe under internal pressure. This fortunately creates forces which tend to reduce loads due to flange twisting.

The stress due to twisting of the flange increases as the twisting increases and the natural reaction is to say that the flanges should be made thicker. This has been the practice, but for large pipes and high pressures, this usually requires extremely thick flanges, and to me does not appear to be a satisfactory solution of the problem.

2

An object of this invention is to produce an improved bolted flange joint structure that does not require a material increase in flange thickness in order to care for increased pipe sizes, or increased pressures.

Another object is to produce a bolted flange joint structure that is much stronger than the commercial type flange joints, such as approved by the American Standards Association.

A further object is to produce a bolted flange joint structure requiring but a minimum amount of machine work.

A still further object is to produce a simple, rugged bolted flange joint structure, that weight for weight, is at least four times as strong as present commercial types.

A further object is to produce a bolted flange joint structure for connecting pipes or other hollow circular members or devices that is easy to manufacture, requires but a minimum of machine work and is much stronger than present commercial types designed and constructed for use under the same conditions.

A further and more specific object is to produce a bolted flange joint assembly which includes means that makes it unnecessary to rely on the rigidity of the flanges themselves in order to obtain maximum resistance to twisting of the flanges when in use.

A further object of this invention is to produce a device capable not only of materially increasing the strength of a bolted flange joint but of serving as means for retaining in place the packing for such joint.

A further object is to produce a device which, when used in a bolted flange joint having standard flanges not only greatly increases the strength of such joint, but seals the same.

A still further object is to produce a gasket or packing retainer ring which, when used in a standard type bolted flange joint greatly increases the strength of such joint.

These, as well as other objects, I attain by means of the structure disclosed in the specification and illustrated in the drawings accompanying and forming part of this application.

The flanges of a joint embodying this invention may be threaded and used as a coupling to connect two sections of pipe, or two other hollow circular members or devices, or the flanges may be welded to or formed on the ends of pipe sections or other hollow circular members or devices.

The flanges or flange members may be cast or forged or punched from metal plate-like material.

Figure 2:
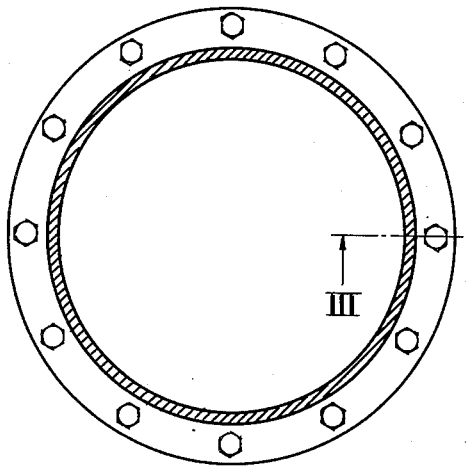
Fig. 2 is a view looking at the top of Fig. 1 from line II—II.
Figure 3:
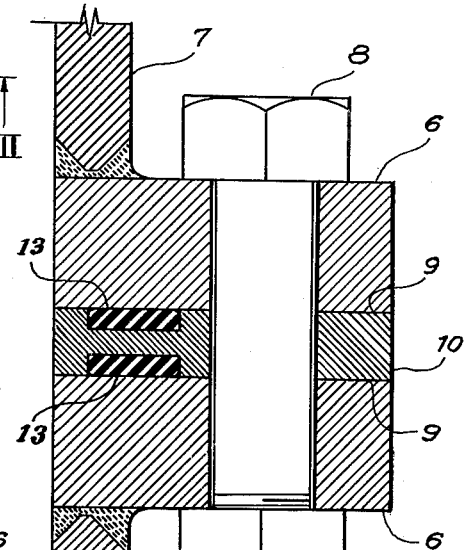
Fig. 3 is a sectional view taken on line III—III of Fig. 2, but on an enlarged scale.
Figure 1:
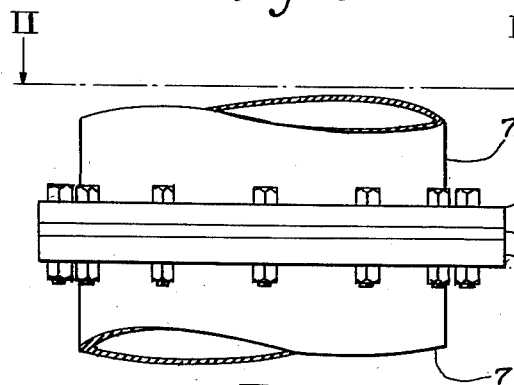
Figure 1 is a side elevational view of a portion of two pipe sections connected by a bolted flange structure embodying this invention.
Figure 4:
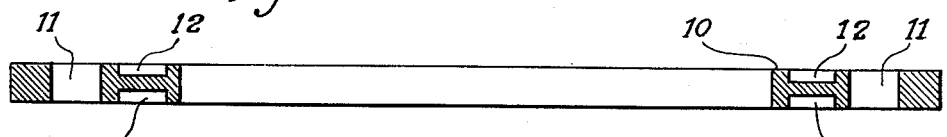
Fig. 4 is a sectional elevational view taken through the center of the gasket or packing retainer ring which forms an important part of a bolted joint assembly embodying this invention.
Figure 5:
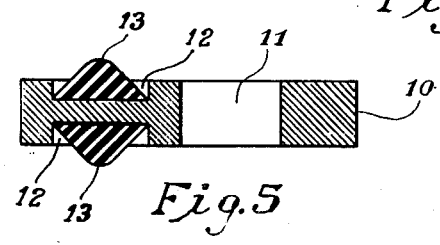
Fig. 5 is a sectional view of the retainer ring and packings or gaskets disclosed in Fig. 3. In this view, the packings or gaskets are shown as they appear normally, or in undeformed condition.

In Fig. 3 of the drawings, flanges 6 are shown as welded to pipe sections 7. Each flange 6 is provided with a circular row of holes for receiving bolts 8. The spacing and therefore the number of bolt holes, and the sizes of the bolts will depend on the size of the flanges and the internal pressures to which the pipe sections or other hollow circular members or devices are to be subjected when in use.

The adjacent faces 9 of the flanges are preferably relatively flat and relatively smooth as indicated in the drawings but flanges with stepped or offset faces may be employed if desired.

Between the adjacent faces of the flanges, I arrange or interpose a supplemental agent 10. This agent not only supplements the flange members but serves as a gasket or packing retainer or member. This member is preferably annular and preferably has an outside diameter which is substantially the same as the outside diameter of the flanges. Its inside diameter is also preferably the same as the inside diameter of the flanges.

Agent or member 10 is also provided with a circular row of holes 11 which have the same spacing and preferably the same size as the bolt holes of the flanges.

The opposite sides of member 10, preferably midway between the inner peripheral edge of such member and the circular row of holes 11, are provided with annular grooves 12. Each of these grooves is preferably rectangular in cross section and within each groove a resilient gasket or sealing ring 13 is positioned. These resilient rings are preferably generally triangular in cross section are bilaterally symmetrical and are preferably formed of rubber of a consistency such that it is substantially incompressible when confined, but when unconfined may be elastically deformed.

The base of each triangular sealing ring is of such width as to snugly fit the bottom of the groove and it is preferably vulcanized or cemented to the floor or bottom of its groove in the supplemental agent or retainer ring so that such agent or retainer ring and its two packing or sealing elements or rings may be handled as a unit.

Each packing or sealing ring is of such size and shape with relation to the size and shape of its groove that an appreciable part of each ring normally projects above the top of its groove; that is, above the top of the groove side walls. In other words, the volume of material in each packing or sealing ring is such with relation to the volumetric capacity of its groove that the packing or sealing rings substantially fill but preferably do not overfill the grooves when fully elastically deformed the flanges are forced into metal to metal contact with supplemental agent 10.

It is preferable to have the grooves slightly underfilled rather than overfilled, since overfilling will cause pinching and permanent distortion of the packings or gaskets. The volume of material in each packing ring or gasket must be such with relation to the volumetric capacity of the pocket that when the flanges or flange members are forced by the bolts into metal to metal contact with supplemental agent 10, the joints between such flanges or flange members and such agent are sealed against any pressures to which such joints may be subjected.

While dense rubber is preferred for the packing rings or gaskets, other materials having characteristics of rubber may be used, if desired.

If flanges having stepped or offset faces are used, supplemental agent 10 can be formed with stepped or offset faces to accommodate such flanges.

While it is preferred to form the grooves for the packing rings or gaskets in opposite side faces of supplemental agent 10, such grooves may be made in the flanges themselves or they may be made partly in the flanges and partly in such supplemental agent.

From the above, it will be seen that a flanged joint made in accordance with this invention allows the two flanges to be bolted rigidly together with continuous metallic contact around the outer portion of the flange faces and supplemental agent 10. This contact results in a force or reaction around such outer portion when fluid pressure is applied to the inside of the connected pipes. The effect of this force or reaction is to prevent the flanges from pivoting radially about the outer periphery of the gasket as in the usual construction, thus utilizing the bending strength of the flange material to resist the internal pressure rather than relying entirely on the torsional strength of each flange, as is usually done, and which requires several times the flange thickness to adequately resist the same internal pressure.

Having thus described my invention, what I claim as new and desire to secure by Letters Patent is:

1. A bolted flange joint comprising two metal flange members each provided with a circular row of bolt holes intermediate its inner and outer peripheral edges, an annular metallic agent located between such flange members; such agent having a circular row of bolt holes registering with those of such members; each face of such agent between its row of bolt holes and its inner peripheral edge being provided with a continuous packing groove which is of generally rectangular cross section, an elastically deformable packing element located within each such groove and projecting outwardly beyond the top thereof; each such packing element being bilaterally symmetrical, having a base which snugly fits the bottom of its groove and which, from its base to its top, is of decreasing width, whereby groove space is provided on opposite sides thereof to accommodate such packing as the same is deformed when said flange members are forced into metal to metal contact with such agent, and bolts extending through said bolt holes for forcing such flange members into metal to metal contact with such agent; the volume of each such packing element with relation to the volumetric capacity of its groove being such that each such packing element will substantially fill but not overfill its groove.

2. A structure as defined in claim 1 in which the opposite faces of the annular metallic agent except for said grooves is flat.

3. A structure as defined in claim 1 in which the packing element is formed of rubberlike material, which when confined is substantially incompressible.

4. A structure as defined in claim 1 in which the annular metallic agent is flat and has substantially the same inner and outer diameters as the flange members.

5. A structure as defined in claim 1 in which the grooves for the packing elements are formed entirely in opposite side faces of the annular metallic agent.

6. A bolted flange joint comprising a pair of annular metal flange members each provided with a circular row of bolt holes intermediate its inner and outer peripheral edges, an annular supplemental metallic agent located between such flange members, such agent having bolt holes registering with those of the flange members and being provided with a packing groove in each side face thereof, a resilient packing member which is bilaterally symmetrical and generally triangular in cross section located within each such groove, normally projecting above the groove side walls and being of such volume with relation to the volumetric capacity of its groove that when said flange members are forced into metal to metal contact with each such agent said resilient packing substantially completely fills but does not over-fill its groove, and bolts extending through the bolt holes in said flange members and said agent for forcing said flanges into metal to metal contact with said agent.

7. A device capable of materially increasing the strength of a bolted flange joint and of serving as means for retaining in place the packing for such joint; such device comprising a flat annular metallic member having substantially the same inner and outer diameters as the joint flanges with which it is to be used, having holes through which the bolts of the joint can pass, and which in each of its flat faces is provided with a packing groove, and a resilient packing located within each such groove; each such packing being bilaterally symmetrical and of general triangular shape in cross section and of such volume with relation to the volumetric capacity of its groove that when not in use, such packing projects above the top of its groove side walls and when in use substantially completely fills but does not overfill its groove.

8. A device capable of materially increasing the strength of a bolted flange joint and of serving as means for retaining in place the packing for such joint; such device comprising an annular metallic member having holes through which the bolts of the joint can pass, and which in its opposite faces is provided with packing grooves, and a resilient packing located within each such groove; each such packing being bilaterally symmetrical in cross section and of such size and shape with relation to the size and shape of its groove that when not in use, such packing projects above the top of its groove side walls and when in use substantially completely fills but does not overfill its groove.

9. A structure as defined in claim 8, in which the annular metallic member is flat.

10. A structure as defined in claim 8, in which the packing grooves are rectangular in cross section.

11. A bolted flange joint comprising two metal flange members each provided with a circular row of bolt holes intermediate its inner and outer peripheral edges, an annular metallic agent located between such flange members, and having a circular row of bolt holes registering with those of such flange members, each face of said agent between its row of bolt holes and its inner peripheral edge being provided with a continuous packing groove, an elastically deformable, bilaterally symmetrical packing element located within each such groove, having its top narrower than the top of such groove and being of such height as to project outwardly beyond the top of the groove side walls, and bolts extending through said bolt holes for forcing such flange members into metal to metal contact with such agent; the volume of each such packing element with relation to the volumetric capacity of its groove being such that each such element substantially fills but does not overfills its groove when the flange members are forced into metal to metal contact with such annular metallic agent.

JAMES O. JACKSON.

REFERENCES CITED

The following references are of record in the file of this patent:

UNITED STATES PATENTS

| Number | Name | Date |
|---|---|---|
| 494,402 | Walsh | Mar. 28, 1893 |
| 1,035,810 | Osborne | Aug. 13, 1912 |
| 2,307,828 | Eggleston | Jan. 12, 1943 |

FOREIGN PATENTS

| Number | Country | Date |
|---|---|---|
| 114,384 | Australia | Dec. 24, 1941 |

Certificate of Correction

Patent No. 2,513,178 June 27, 1950

JAMES O. JACKSON

It is hereby certified that error appears in the printed specification of the above numbered patent requiring correction as follows:

Column 1, line 42, after the word "by" insert *an*; column 3, line 52, after "each" insert *such*; column 4, line 3, after "deformed" insert *as*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*